United States Patent [19]

Trösken et al.

[11] Patent Number: 4,751,366
[45] Date of Patent: Jun. 14, 1988

[54] PROCESS FOR THE ARC WELDING OF NITROGEN ALLOYED STEELS

[75] Inventors: Friedhelm Trösken, Bochum; Reinhard Müller, Essen, both of Fed. Rep. of Germany

[73] Assignee: Fried Krupp GmbH, Essen, Fed. Rep. of Germany

[21] Appl. No.: 861,888

[22] Filed: May 12, 1986

[30] Foreign Application Priority Data

May 11, 1985 [DE] Fed. Rep. of Germany ....... 3517015

[51] Int. Cl.$^4$ ............................................. B23K 9/225
[52] U.S. Cl. ........................ 219/137 R; 219/137 WM
[58] Field of Search ............. 219/137 R, 137 WM, 72

[56] References Cited

U.S. PATENT DOCUMENTS

| | | | |
|---|---|---|---|
| 2,371,823 | 3/1945 | Jackson | 219/137 R |
| 2,902,587 | 9/1959 | Bernard | 219/74 |
| 3,670,135 | 6/1972 | Zvanut | 219/137 WM |
| 3,767,891 | 10/1973 | Haverstraw et al. | 219/137 WM |

FOREIGN PATENT DOCUMENTS 2924415 12/1980 Fed. Rep. of Germany .
1402027 5/1965 France .

OTHER PUBLICATIONS

DIN 32 525, Part 2, Aug. 1979 edition.
Frohberg, Martin G.: Thermodynamik fuer Metallurgen und Werkstofftechniker (In translation, Thermodynamics for Metallurgists and Material Technicians), Leipzig: VEB Deutscher Verleg fuer Grundstoffindustrie (German Publishers for the Raw Material Industry), 1980.
Schneck et al, "Untersuchungen Ueber die Beeinflussung der Gleichgewichte von Stickstoff mit Fluessigen Eisenlegierrungen Durch den Zusatz Weiter Elemente (II) (Investigations Concerning the Influence on the Equilibria of Nitrogen with Liquid Iron Alloys by the Addition of Other Elements), Archiv fuer das Eisenhuettenwesen 30 (Archives for the Metallurgical Industry), (1959), 9, pp. 533 to 537.
Bekkers et al, "Welding of Special Metals–Properties and Uses of Modern, Corrosion-Resistant Welding Filler Metals", DVS Report 83 (1983), German Publishers for Welding Technology (DVS) GmbH, Dusseldorf, pp. 46 to 51.
Kirk-Othmer, Encyclopedia of Chemical Technology, vol. 24, pp. 502 to 507, Third Edition, John Wiley & Sons (1984).

Primary Examiner—E. A. Goldberg
Assistant Examiner—C. M. Sigda
Attorney, Agent, or Firm—Sughrue, Mion, Zinn, Macpeak, and Seas

[57] ABSTRACT

Process for arc fusion welding under atmospheric conditions of a base material which is a nitrogen alloyed steel, in which the bulk share of nitrogen in the steel is above its solubility limit under atmospheric conditions. The nitrogen released during the melting of the base material is confined to the melting bath formed during the welding.

10 Claims, 1 Drawing Sheet

PROCESS FOR THE ARC WELDING OF NITROGEN ALLOYED STEELS

BACKGROUND OF THE INVENTION

The present invention relates to a process for arc fusion welding under atmospheric conditions a nitrogen alloyed steel, in which the bulk share of nitrogen in the steel is above its solubility limit under atmospheric conditions.

This type of steel can be produced, e.g., as Cr-Mn steel, by the so-called pressure electroslag remelting process (DESU process, see, e.g., DE-PS 29 24 415) or in a plasma arc furnace. The high nitrogen content is supposed to bring about a clear increase in the hardness level, without having any negative influence on the toughness and molding properties.

The solubility limit, also called simply solubility, of a steel for nitrogen essentially depends on the partial pressure of the nitrogen, and on the nature and amount of alloy elements in the steel, whereby the partial pressure of the nitrogen refers to the partial pressure of the nitrogen during the fusible condition of the steel. The solubility of the steel for nitrogen increases with the square root of this partial pressure.

While the nitrogen solubility of pure iron $[\% \ N_g]_{Fe}$ with a partial nitrogen pressure of 0.8 bar is 0.0395% (the % numbers in these documents always refer to % by bulk or weight), the nitrogen solubility limit $N_g$ (hereafter referred to as nitrogen solubility for short) of an iron-rich multicomponenet alloy, thus of a steel, is $$[\% \ N_g]_{Fe,C,X,Y,\ldots} = 0.0395/f_N \quad (1)$$

whereby $f_N$ is the so-called activity factor which is the power formed, according to Frohberg, Martin G.: Thermodynamik fuer Metallurgen und Werkstofftechniker, Leipzig: VEB Deutscher Verlag fuer Grundstoffindustrie 1980, from base 10 and the exponents consisting of the sequence $$e_N^C[\% \ C] + e_N^X[\% \ X] + e_N^Y[Y] + \ldots$$

In other terms, the regular or decimal logarithm of the so-called activity factor $f_N$ is equal to the above sequence, whereby $$e_N^C, e_N^X, e_N^Y, \ldots$$

represent the so-called interaction coefficient of carbon and the other alloy elements (here designated generally by X, Y, ... ) for nitrogen and $$[\% \ X], [\% \ Y], \ldots$$

represent the share of the respective alloy elements in the steel.

According to H. Schenck, M. G. Frohberg and H. Graf: Untersuchungen ueber die Beeinflussung der Gleichgewichte von Stickstoff mit fluessigen Eisenlegierungen durch den Zusatz weiterer Elemente (II) [Investigations Concerning the Influence on the Equilibria of Nitrogen with Liquid Iron Alloys by the Addition of Other Elements], Archiv fuer das Eisenhuettenwesen 30 [Archives for the Metallurgical Industry] (1959) 9, pages 533–537, the interaction coefficients for the individual alloy elements are as follows:

| Element | $e_N$ | Element | $e_N$ |
| --- | --- | --- | --- |
| chromium | −0.045 | niobium | −0.061 |
| carbon | +0.125 | silicon | +0.065 |
| manganese | −0.020 | titanium | −0.530 |
| molybdenum | −0.013 | vanadium | −0.010 |
| nickel | +0.010 | tungsten | −0.0015 |

Based on these values it is possible to determine the nitrogen solubility $N_g$ for a nitrogen partial pressure of 0.8 bar for each steel for which the chemical composition is known, as:

$$[\% \ N_g]_{Log(Fe,C,X,Y,\ldots)} = \frac{0.0395}{10^{e_N^C[\% \ C] + e_N^X[\% \ X] + e_N^Y[\% \ Y] + \ldots}} \quad (2)$$

For the arc fusion welding of highly nitrogenized steels in normal shops and construction sites where atmospheric conditions are always present, the nitrogen is subject to only a low partial pressure of about 0.8 bar. Forcefully dissolved nitrogen, i.e. nitrogen which, during production, was added beyond the solubility of the steel, escapes from the molten areas of the steel, which leads to a high degree of porosity in the welding zone. The area of application for pressure nitrogenized steels, e.g., austenitic, non-magnetic steels with high strength, thus, is limited to construction parts or work pieces which do not have to be welded, as this type of steel is not considered weldable with this behavior.

SUMMARY OF THE INVENTION

An object of the present invention is to provide a process for welding highly nitrogenized steels under atmospheric conditions without introducing porosity into the weld.

Another object of the present invention is to provide such a process in which the welded connections have mechanical-technological quality values and chemical-physical properties equivalent to the base material.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for arc fusion welding under atmospheric conditions of a base material which is a nitrogen alloyed steel, in which the bulk share of nitrogen in the steel is above its solubility limit under atmospheric conditions, comprising confining the nitrogen released during the melting of the base material to the melting bath formed during the welding. Thus, the present invention is based on the concept of not letting the nitrogen, released during the melting of the base material, escape from the melting bath, but to largely retain it in the melting bath.

In one embodiment of the present invention, there is provided a process for arc fusion welding under atmospheric conditions two work pieces, each made from a base material which is a nitrogen alloyed steel, in which the bulk share of nitrogen in the steel is above its solubility limit under atmospheric conditions, wherein a welding seam is formed between the two work pieces from base material from each work piece and from a welding filler metal which is added to the molten pool of metal formed during the welding, comprising adding as the welding filler metal a metal, the pure welding deposit (SG) of which has a nitrogen absorption capability ($N_{aSG}$) which is at least equal to the difference between the actual nitrogen content ($N_{iGW}$) of the base material to be welded and the nitrogen solubility ($N_{gGW}$) of the base material, multiplied by the quotient $(A_1+A_2)/A_3$, where $A_1$ is the cross sectional surface area of the penetration of the base material of the first work piece into the weld, $A_2$ is the cross sectional surface area of the penetration of the base material of the second work piece into the weld, and $A_3$ is the cross sectional surface area of the welding area solidified from the pure welding deposit of the filler metal.

In this embodiment of the present invention, the nitrogen escaping from the base material is dissolved by the high absorption capacity of the welding filler material in the welding zone.

In another embodiment of the present invention, there is provided a process for arc fusion welding under atmospheric conditions a nitrogen alloyed steel, in which the bulk share of nitrogen in the steel is above its solubility limit under atmospheric conditions, wherein a welding seam is formed on the steel from a liquid melting bath created by the welding, comprising protecting the entire liquid melting bath of the welding seam from the atmosphere during the welding by covering it by the plasma of the arc.

In this second embodiment of the invention, it has, surprisingly, been shown that a release from the melting bath of the forcefully dissolved nitrogen can also be largely prevented when the plasma of the arc protects each melted area of the welding area against the surrounding atmosphere. This can be done in the simplest case, as with TIG welding (tungsten-inert gas arc welding), completely without the use and addition of any welding filler metal. Between the arc plasma and the melting bath, a condition of nitrogen equilibrium is formed by the fact that only small amounts of nitrogen transfer form the melting bath into the plasma. The nitrogen in the plasma is in interaction with the nitrogen of the melting bath through the phase boundary of the plasma/melting bath. The nitrogen can escape from the plasma to the atmosphere almost exclusively through convection just above the melting bath or the work piece surface. Other mechanisms which could provide for an escape of the nitrogen from the plasma are eliminated as the nitrogen partial pressure in the plasma is, with 0.8 bar, in no case higher than in the atmosphere. Quite to the contrary, it is the case that the plasma could still accept nitrogen from the atmosphere. As the arc is above the melting bath only for a quite short time during welding, the nitrogen loss of the melting bath is also negligibly small.

With the solution to the problem provided by the second embodiment of the invention, the welding point also does not show any porosity and there is practically no stability drop as compared to the base material.

While in both the first and second embodiments of the invention, welding connections without porosity are attained, the stability of which essentially corresponds to the base material, it is preferred when employing a welding filler metal, especially in the second embodiment of the invention, that the welding filler material have a chemical composition that corresponds to the base material or at least approaches it. For this reason it is possible to attain the mechanical-techological quality values and the chemical-physical properties of the base material, especially the corrosion resitance and the magnetic properties even in the welding zone.

The protection of the melting bath against the atmosphere can be done in an easy manner by the fact that the melting bath is completely covered by the plasma of the arc. If necessary, the individual welding parameters, such as welding tension, welding current, welding speed and electrode diameter (especially for inert-gas metal-arc welding or metal-inert gas (MIG) welding, active-gas metal-arc welding, and submerged arc welding (SAW)) have to be set in such a manner that the molten liquid area of the welding seam is in each case not any larger than the cathode spot of the plasma.

If work pieces with a prepared connection seam, e.g., a V-shaped seam, which has a gap are to be welded, the melting bath at the root position of the seam can be protected from the atmosphere, by a protective metallic base, whereby it is advantageous to use as the protective metallic base the same material as the base material of the work piece or at least one of the same composition except with regard to the nitrogen content.

Preferably, when a welding filler metal is employed during welding in the second embodiment of the invention, the welding filler metal is a nitrogen alloyed welding filler metal, the pure welding deposit of which has a nitrogen absorption capability of 0 to 0.2%. It is also possible to employ a welding filler metal and a welding flux, and when so doing the nitrogen absorption capability of the pure welding deposit preferably is 0 to 0.2%.

It is to be understood that both the foregoing general description and the following detailed description are exemplary and explanatory, but are not restrictive of the invention.

In both figures the root position is shown after the solidification of the melting bath, and the cross-section is taken at a position perpendicular to the longitudinal axis of the weld.

DETAILED DESCRIPTION OF THE INVENTION

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Two work pieces 1 and 2, each made of the same steel X3CrNiMoN1813, and having a prepared V-shaped seam 3, are welded under atmospheric conditions by means of a (not shown) stick electrode. The stick electrode is made of a material whose pure welding deposit (SG), as determined according to DIN 32 525-part 2

(edition August 1979), was equivalent to the pure welding deposit obtained from the material known as No. 1.4842. The term "pure welding deposit" as used throughout the specification and claims means that part of the welding filler metal (which in this example is material of the electrode), solidified from the molten liquid state, which has not mixed with the base material of the work pieces.

Steel X3CrNiMoN1813 had the following composition:

| | |
|---|---|
| carbon | 0.029% |
| silicon | 1.5% |
| manganese | 2.2% |
| chromium | 17.5% |
| nickel | 13.0% |
| molybdenum | 4.6% |
| nitrogen | 0.6% |
| iron | remainder | and the pure welding deposit of the electrode had the composition:

| | |
|---|---|
| carbon | 0.10% |
| chromium | 24.0% |
| nickel | 20.0% |
| manganese | 5.5% |
| silicon | 0.4% |
| iron | remainder |

Figure 1:
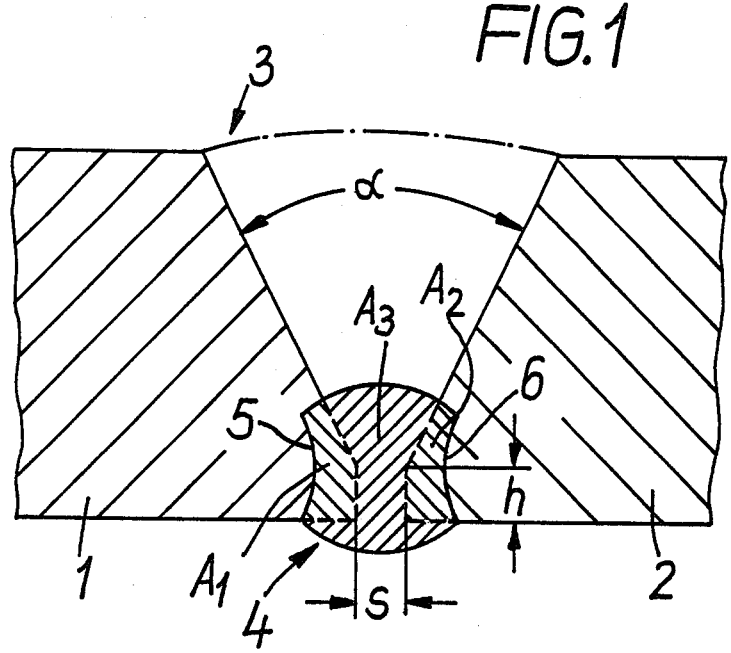
FIG. 1 shows a cross section of a weld formed according to the first embodiment of the present invention, and wherein the root position of the weld is formed on a prepared V-shaped seam.
Figure 2:
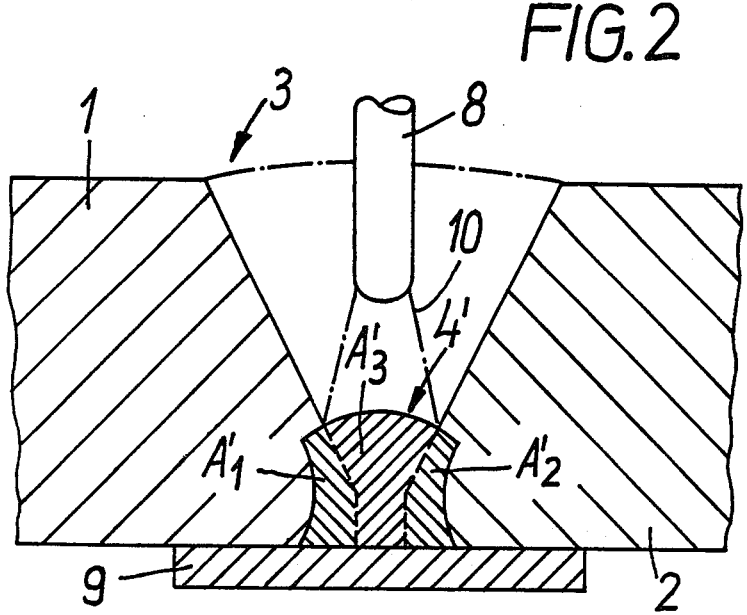
FIG. 2 shows a cross section of a weld formed according to the second embodiment of the present invention, and wherein the root position of the weld is formed on a prepared V-shaped seam and the melting bath at the root position of the seam is protected from the atmosphere by a protective metallic base.

The V-shaped seam 3 had been prepared with an opening angle α of 60°, a gap "s" of 3 mm and a thickness of root face "h" of 1.5 mm. The root seam 4 shown in FIG. 1 has on each work piece 1 and 2 an undercut 5 or 6, corresponding to the boundary between the portion of the work piece that has melted to become part of the weld (i.e. the penetration of the base material of the work piece into the weld) and the remaining not melted work piece. The cross sectional surface area of the penetration of the base material of work piece 1 is shown in FIG. 1 as $A_1$, and the cross-sectional surface area of the penetration of the base material of work piece 2 is shown as $A_2$. The pure welding deposit of the electrode is present about in the center of root seam 4 and has a cross sectional surface area $A_3$. Thus, the root seam 4 consists of base material from the work pieces 1 and 2, with the amount of base material in the root seam being given in percent by the formula (3)

$$100(A_1+A_2)/(A_1+A_2+A_3) \qquad (3)$$

and a pure welding deposit of the electrode, with the amount of pure welding deposit in the root seam being shown in percent by the formula (4)

$$100A_3/(A_1+A_2+A_3) \qquad (4)$$

In this example, the ratio $$(A_1+A_2)/A_3 \qquad (5)$$

in the root seam has been maintained at 0.9 by.

According to the above formula (2), the following nitrogen solubility limit $N_g$ is attained under atmospheric conditions:

(a) for the base material $$[\%N]_{X3CrNiMoN1813}=0.175\% \qquad (6)$$

(b) for the pure welding deposit of the electrode $$[\%N]_{1.4842}=0.354\% \qquad (7)$$

The percent share of the nitrogen which attempts to escape from the base material (GW) during melting, is proportional to the difference $(N_i-N_g)_{GW}$ between its actual nitrogen share $N_i$ and its nitrogen solubility $N_g$.

The nitrogen absorption capability $N_a$ in percent of the pure welding deposit (SG) is determined from the difference between the nitrogen solubility $N_g$ and an approximately present actual nitrogen share $N_i$, as shown by formula (8).

$$(N_a)_{SG}=(N_g-N_i)_{SG} \qquad (8)$$

In order for the welding seam to be without porosity, the nitrogen absorption capability $N_a$ of the welding deposit, taking into account the surface parts $A_1$, $A_2$ and $A_3$, has to be at least as great as the amount of nitrogen to be given off by the base material (GW)

$$(N_a)_{SG} \geqq \frac{A_1+A_2}{A_3} \cdot (N_i-N_g)_{GW} \qquad (9)$$

With the above indicated value $(A_1+A_2)/A_3=0.9$, the required nitrogen absorption capability $N_a$ of the pure welding deposit of the welding filler metal is given as $$(N_a)_{SG} \leqq 0.9(0.56-0.175)=0.346\% \qquad (10)$$

This required nitrogen absorption capability is surpassed by the actual nitrogen solubility of the welding deposit cited above under (b), so that the nitrogen escaping from the base material is completely absorbed in the welding deposit of the welding filler metal. The executed welding seam is without porosity and free of other welding defects.

The beads and layers (not shown in detail) of the V-shaped seam 3 added on root seam 4 are not as critical with regard to porosity as the root seam 4 it self, as base material of the work pieces 1, 2 is molten at most only at one side or flank of the respective bead.

EXAMPLE 2

Two work pieces 1 and 2 with the same seam preparation and consisting of the same steel as those in Example 1 were welded with a stick electrode 8 in a manual arc welding process by a root seam 4' and (not shown in detail) the other beads of the whole seam 3 located above. Before the execution of the root seam 4', the gap "s" of the prepared V-shaped seam 3 was underlayed with a protective metal base 9 of X3CrNiMoN1813 for the melting bath. The pure welding deposit obtained according to DIN 32 525 part 2 (edition August 1979) of the electrode 8 resembled a material from the material No. 1.3986. It was taken care that the actual molten liquid part of the welded seam was fully covered by the plasma 10 of the arc. Thus, while the bottom of the welded seam is protected from the atmosphere by the protective base metal 9 the top is protected by the plasma.

The pure welding deposit of the electrode 8 had the composition

| | |
|---|---|
| carbon | 0.034% |

-continued

| | |
|---|---|
| silicon | 0.58% |
| manganese | 5.17% |
| chromium | 22.87% |
| molybdenum | 3.18% |
| nickel | 17.32% |
| nitrogen | 0.346% |
| iron | remainder |

The welded connetion was without porosity and had an apparent yielding point $R_{p\ 0.2}$ of almost 600 N/mm² at +20° C.

While the nitrogen absorption capability $N_a$ of the pure welding deposit of the electrode during melting under atmospheric conditions (as stated already in Example 1) should be at least 0.346%, it is in this example (with $(A'_1+A'_2)/A'_3=0.9$), because of its own high nitrogen content of already 0.346%, only $$(N_a)_{SG}=(N_g-N_i)_{SG}=0.359-0.346=0.013\% \tag{11}$$

V-shaped seam 3 may also be performed by way of gas-shielded metal arc welding, especially by way of short arc welding. This way of welding keeps the actual liquid melting bath of the respective bead rather small, so covering it by the plasma of the arc is simplified. Furthermore welding current is only of little amperage.

It would be possible to obtain a good welding result even when working without a protective metal base 9, by the porous root seam would be mechanically removed after completion the whole V-shaped seam 3, and the root seam replaced by a new welded seam, of which, in each case, the molten liquid area is covered completely by the plasma of the arc.

It will be understood that the above description of the present invention is susceptible to various modifications, changes and adaptations, and the same are intended to be comprehended within the meaning and range of equivalents of the appended claims.

What is claimed is:

1. Process for arc fusion welding under atmospheric conditions two work pieces in the form of a first work piece and a second work piece, each made from a base material which is nitrogen alloyed steel, in which the bulk share of nitrogen in the steel is above the solubility limit of nitrogen in the nitrogen alloyed steel under atmospheric conditions wherein a weld containing a welding seam is formed between the two work pieces from base material from each work piece and from a welding filler metal which is added to the molten pool of metal formed during the welding, the weld containing a welding area comprised of a pure welding deposit of the filler metal, an area where base material of the first work piece has penetrated, and an area where base material of the second work piece has penetrated, comprising: adding as the welding filler metal, a metal which forms a pure welding deposit (SG) which has a nitrogen absorption capability ($N_{aSG}$) which is at least equal to the product formed by multiplying $$(N_{iGW})-(N_{gGW})$$

where $(N_{iGW})-(N_{gGW})$ is the difference between the actual nitrogen content $(N_{iGW})$ of the base material (GW) to be welded and the nitrogen solubility $(N_{gGW})$ of the base material, by the quotient $$(A_1+A_2)/A_3$$

wherein $A_1$ is the cross sectional surface area of the penetration of the base material of the first work piece into the weld, $A_2$ is the cross sectional surface area of the penetration of the base material of the second work piece into the weld, and $A_3$ is the cross sectional surface area of the welding area solidified from the pure welding deposit of the filler metal, to absorb in the welding deposit nitrogen from the base material of the first and second work pieces.

2. Process for arc fusion welding under atmospheric conditions a base material which is a nitrogen alloyed steel, in which the bulk share of nitrogen in the steel is above the solubility limit of nitrogen in the nitrogen alloyed steel under atmospheric conditions, wherein an arc having a plasma is formed and a welding seam is formed on the steel from a liquid melting bath created by melting base materials during the welding, comprising protecting the entire liquid melting bath of the welding seam from the atmosphere during the welding, by covering the entire liquid melting bath of the welding seam by the plasma of the arc to confine the nitrogen which is present in the base material which is being melted to the melting bath formed during the welding.

3. Process according to claim 2, comprising producing the welding seam by gas shielded metal arc welding.

4. Process according to claim 3, comprising producing the welding seam by short arc welding.

5. Process according to claim 2, wherein the welding is performed in a prepared connecting seam which has a gap, and further comprising providing a metallic base below the connecting seam.

6. Process according to claim 5, wherein the material of the metallic base is identical with the material of the steel to be welded.

7. Process according to claim 5, wherein the material of the metallic base is identical with the material of the steel to be welded except with regard to the nitrogen content.

8. Process according to claim 2, comprising adding a welding filler metal during welding, the welding filler metal being a nitrogen alloyed welding filler metal, the welding filler metal forming a pure welding deposit which has a nitrogen absorption capability of 0 to 0.2%.

9. Process according to claim 2, conducting the welding by employing a welding filler metal and a welding flux, the welding filler metal forming a pure welding deposit which has a nitrogen absorption capability of 0 to 0.2%.

10. Process for arc fusion welding under atmospheric conditions of a base material which is a nitrogen alloyed steel, in which the bulk share of nitrogen in the steel is above the solubility limit of nitrogen in the nitrogen alloyed steel under atmospheric conditions, wherein during the welding base material is melted, a melting bath is formed, and nitrogen is released from the base material, comprising: confining the nitrogen released during the melting of the base material to the melting bath formed during the welding.

* * * * *